United States Patent

Citta et al.

[11] Patent Number: 5,136,375
[45] Date of Patent: Aug. 4, 1992

[54] SPECTRUM COMPATIBLE-HDTV DATA TRANSMISSION SYSTEM

[75] Inventors: Richard W. Citta, Oak Park; Dennis M. Mutzabaugh, Mount Prospect, both of Ill.

[73] Assignee: Zenith Electronics Corporation, Glenview, Ill.

[21] Appl. No.: 553,822

[22] Filed: Jul. 17, 1990

[51] Int. Cl.$^5$ ............................................. H04N 11/06
[52] U.S. Cl. .................................................... 358/133
[58] Field of Search ................. 358/133, 141, 142, 12, 358/186, 135, 136; 375/28, 22, 27

[56] References Cited

U.S. PATENT DOCUMENTS

| | | | |
|---|---|---|---|
| 4,700,360 | 10/1987 | Visser | 375/22 |
| 4,745,473 | 5/1988 | Hall | 358/133 |
| 4,785,356 | 11/1988 | Gonzales et al. | 358/133 |
| 4,821,119 | 4/1989 | Gharari | 358/136 |
| 4,969,040 | 11/1990 | Gharari | 358/135 |
| 5,016,100 | 5/1991 | Citta et al. | 358/141 |

Primary Examiner—Howard W. Britton
Assistant Examiner—Kim Yen Vu

[57] ABSTRACT

A spectrum compatible HDTV data transmission system includes an adaptive delta modulator for producing 12-bit packets comprising direction and slope components of successive groups of three samples of removed low frequency video siganl. The 12-bit packets are compressed by a lookup table to four-bit output codes prioritized according to the statistical likelihood of occurrence of the 12-bit packet in a typical video signal. The 15 most likely to occur 12-bit packets are mapped to four-bit output codes 1-15 and the remaining 4080 12-bit packets are mapped to a common four-bit linking code. The next 255 most likely to occur of the remaining 4080 12-bit packets are further mapped to eight-bit output codes. All of the remaining 12-bit packets are mapped to the common remaining state of the eight-bit output codes. The compressed output codes are correlated with the constellation states of a quadrature modulator, with the constellation states requiring the least transmission power corresponding to the most likely to occur of the four-bit output codes. The output codes are multiplexed with the high frequency video before application to the quadrature modulator. The output of the modulator is transmitted at RF frequencies.

39 Claims, 3 Drawing Sheets

SPECTRUM COMPATIBLE-HDTV DATA TRANSMISSION SYSTEM

BACKGROUND OF THE INVENTION AND PRIOR ART

This invention relates generally to video signal transimission systems and specifically to a low power data transmission system for use in conjunction with a HDTV system.

The spectrum compatible high definition television (HDTV) system recently proposed by Zenith Electronics Corporation has the capability of transmitting television signals without objectionable interference with NTSC co-channels and adjacent channels (the so-called "Taboo" channels). This is accomplished in part by minimizing the power of the transmitted signals by removing the low frequency portion of the video signal, which requires high transmission power, developing a digital representation thereof and transmittig the digital data with the high frequency portion of the video signal. The digital data is transmitted during the vertical blanking interval (VBI) of the television signal. This approach, when correlated with "frame locking" to the co-channel or adjacent channel signal helps by "hiding" the data in the VBI of the other signal. Thus any interference caused will be much less visible.

Major considerations in transmitting digital data as part of a television signal include the bandwidth required for its transmission and the potential of interference into co-channels and adjacent channels. Therefore the data in the VBI is preferably transmitted at as low a power level as possible, consistent with good recovery, to maintain the noninterfering characteristics of the transmission system. Additionally, it is desirable to use data compression techniques to minimize the required transmission bandwidth for the data.

OBJECTS OF THE INVENTION

A principal object of the invention is to provide a novel transmission system and method for a video signal.

Another object of the invention is to provide a system for transmitting data in a low power, low bandwidth format for use in a television transmission system.

A further object of the invention is to provide an improved HDTV television system.

BRIEF DESCRIPTION OF THE DRAWINGS

These and other objects and advantages of the invention will be apparent upon reading the following description in conjuction with the drawings, in which.

DESCRIPTION OF THE PREFERRED EMBODIMENT

Figure 1:
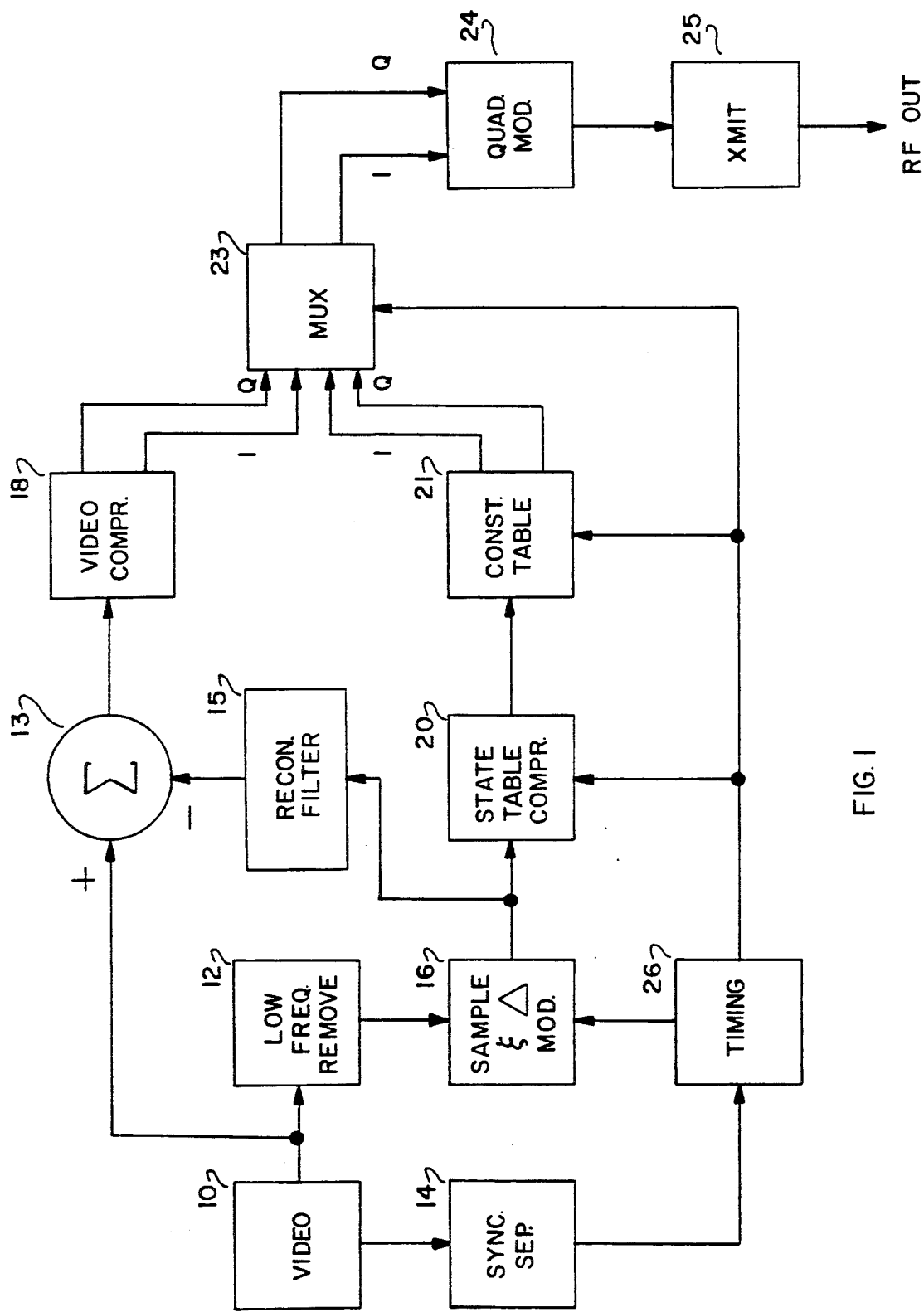
FIG. 1 is a partial block diagram of a transmission system constructed in accordance with the invention.

In FIG. 1, a source of video information 10, which may comprises a wide band signals of about 30 MHz, is coupled to a low frequency removal circuit 12 where the low frequency video information in the signal is subtracted, preferably on a line-by-line basis. The removal low frequency information is sampled and digitized in a sampling and adaptive delta modulator circuit 16, which may be of the type disclosed in Ser. No. 453,525, filed Dec. 20, 1989. The delta modulated slope and amplitude components are applied to a reconstruction filter 15, the output of which is substracted from the video signal from video source 10 in a summation circuit 13. This process assures that the reconstructed low frequency signal added in the receiver has the same resolution as that taken out at the transmitter. The remaining high frequency video signal in the output of summation circuit 13 is supplied to a video compressor 18 where encoding of the high frequency portion is accomplished to enable transmission of the 30 MHz wide video signal in a 6 MHz bandwidth. The low frequency removal and video comprssion techniques are described and claimed in copending applications Ser. Nos. 238,956 and 239,155, both filed Aug. 31,1988, and assigned to Zenith Electronics Corporation. The output of modulator 16 is supplied to a state table compressor 20 where the coded representation of the removed low frequency video information (in the form of delta modulated sample components) is compressed and supplied to a constellation table 21. The outputs of video compressor 18 and constellation table 21 are in I and Q form and are applied to a multiplexer 23 which supplies I and Q output signals to a quadrature modulator 24. The output of modulator 24, which is at intermediate frequency, is applied to a transmitter 25 where the signal is converted for transmission at RF frequency. A sync separator circuit 14 is coupled to video source 10 and supplies a timing circuit 26 for controlling the operation of the various functional blocks of FIG. 1.

Figure 2:
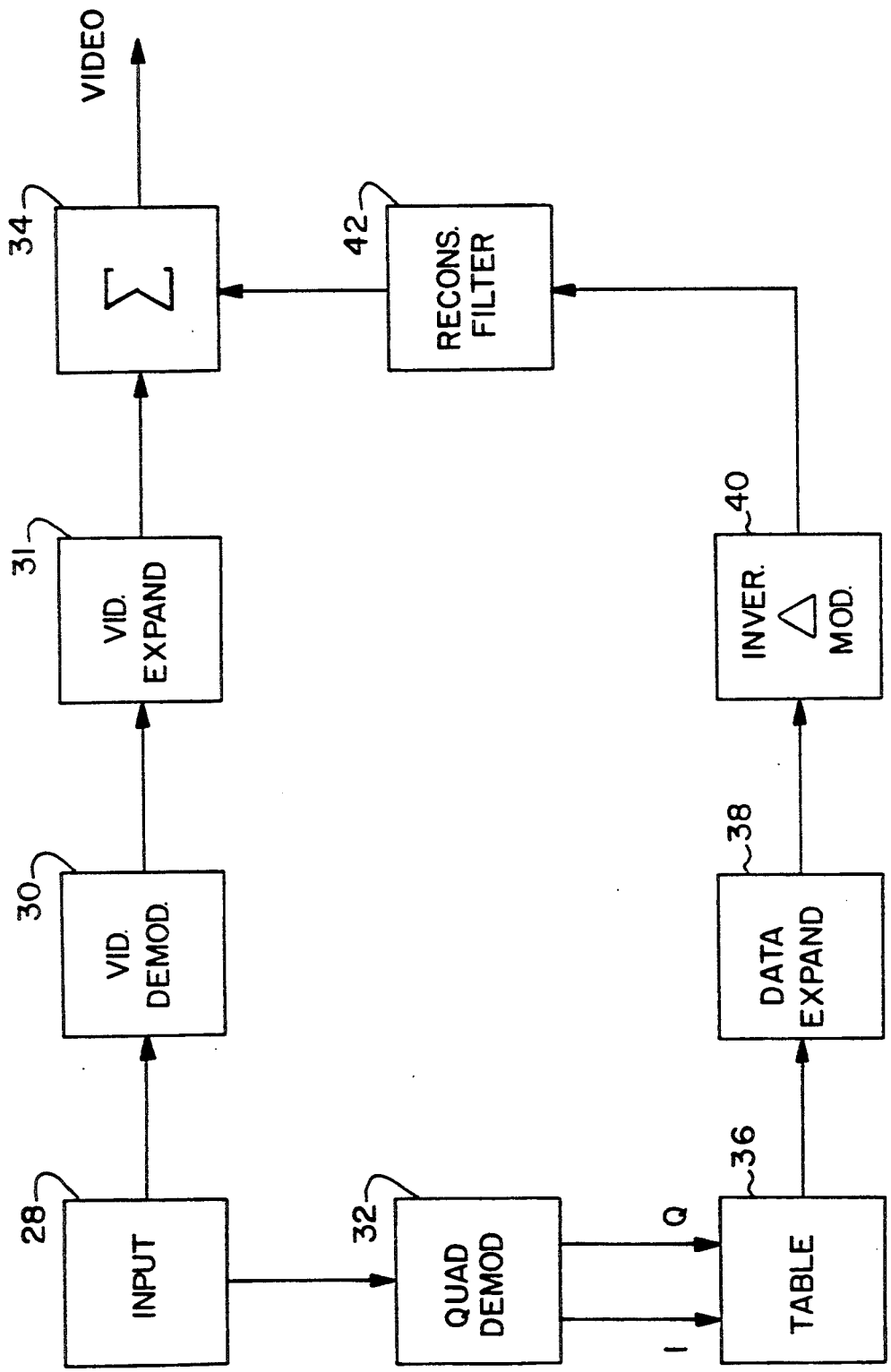
FIG. 2 is a corresponding block diagram of a compatible receiver.

In FIG. 2, a receiver for receiving and decoding the transmitted signal is shown. The receiver input circuit 28 receives the transmitted signal and supplies it to a video demodulator 30 and to a quadrature demodulator 32. The video demodulator 30 recovers the compresses high frequency portion of the transmitted video signal and applies it to a video expander 31. Quadrature demodulator 32 recovers the transmitted compressed data, including the data for reconstituting the remove low frequency video information. The I and Q outputs of quadrature demodulator 32 are supplied to a table 36 for conversion to appropriate four-bit compressed data words that are expanded to 12 bits in a data expander circuit 38. The output of data expander 38 is applied to an inverse delta modulator 40 where the direction and slope components of the data are recovered and supplied to a reconstruction filter 42 where the the removed low frequency video information is reconstituted. The reconstituted low frequency data is applied to a summer 34 where it is recombined with the high frequency video information from video expander 31. The output of summer 34 is the demodulated video signal which is utilized by apparatus (not shown) in a conventional way.

Figure 3:
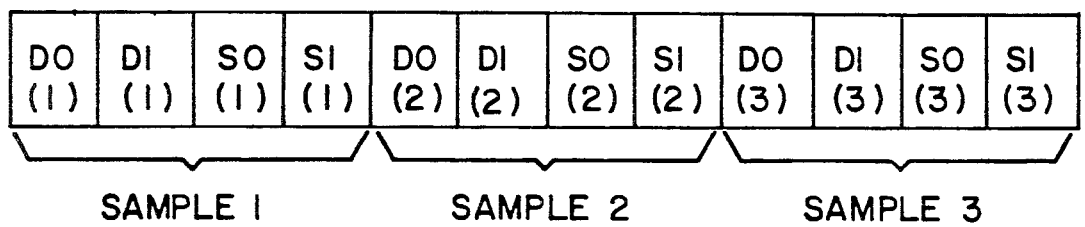
FIG. 3 is a diagram indicating a 12-bit packet of a series of three samples of data in the form of delta modulation comonents.

Referring again to FIG. 1, the removed low frequency video information is digitized by suitable apparatus in block 16 to develop a plurality of samples. Each sample is encoded in a delta modulation format and expressed as four bits of data, with two bits representing the direction of the sample (i.e. whether it is increasing or decreasing) anid two bits representing the slope or amount of any change in magnitude. As illustrated in FIG. 3, the bits are identified as D0 and D1, for direction, and S0 and S1, for slope. The direction and slope bits corresponding to three sucessive samples are grouped together into a 12-bit packet where sample 1, sample 2 and sample 3 each include two bits corresponding to D0 and D1 and two bits corresponding to S0 and S1.

Each 12-bit packet represents a particular state of the three corresponding samples. The packets are entropy encoded to reflect their probability of occurence. Entropy encoding is predictive and is based upon the statistical likelihood of occurrence of each of the 12-bit delta modulation data packets in typical video scene information. Thus, by analyzing a large number of such 12-bit packets derived from a variety of video signals, a classification or hierarchy, based upon the statistical likelihood of occurrence of each packets is developed. Entropy Encoded Packets and State Table Compressor 20 (State Table 20) has the various combinations of 12-bit packets arranged in order of their statistical likelihood of occurrence in a typical video signal. There are 4096 unique combinations of the 12-bit packets. State table 20 maps each 12-bit packet into a compressed four-bit output code, with the first 15 output codes corresponding to the 15 most likely to occur 12-bit packets. These 15 four-bit output codes are effectively supplied directly to the modulator 24, via multiplexer 23. The remaining 12-bit packets are all mapped to the last four-bit output code, referred to herein as a linking code, of state table 20. The linking code and remaining 12-bit packets are in turn supplied to constellation table 21. (In practice the tables 20 and 21 may be provided in the same memory and are separately shown here for purposes of explanation). In response to the linking code, constellation table 21 further maps the 255 most likely to occur of the remaining 4080 12-bit packets (i.e. 4096-16) into a unique eight-bit output code. All of the remaining 12-bit packets (combinations 273-4096) are mapped to the common remaining state of the eight-bit output codes. The four-bit output codes and the four-bit linking code, and the eight-bit output codes are all supplied to quadrature modulator 24, via multiplexer 23.

Figure 4:
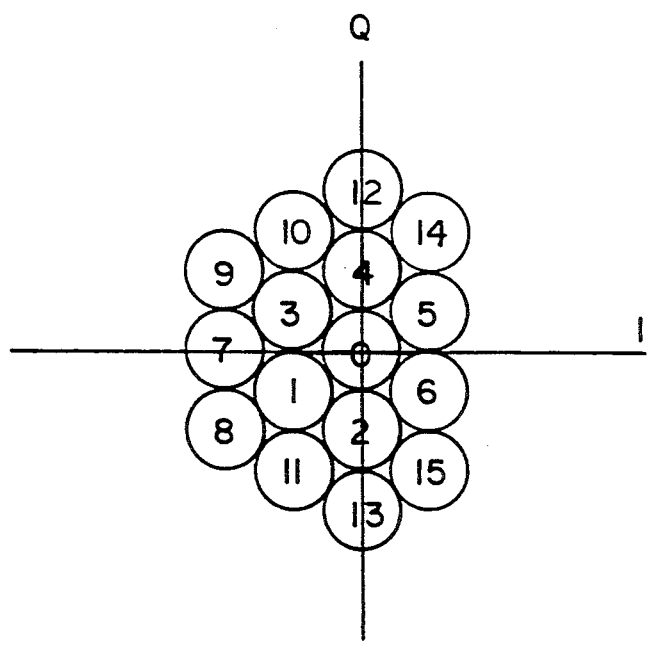
FIG. 4 is a depiction of the constellation states of a quadrature modulator arranged for use with the inventive system.

As shown in FIG. 4, the quadrature modulator operates along I and Q axes. The various circles indicate the constellation states of the modulator. Constellation state "0" occurs at the origin and can be advantageously used to represent a signal requiring the least amount of transmission power. The remaining constellation states are sequentially numbered from 1-15, in the order of increasing transmission power requirements, for signals identified by corresponding I and Q components of the modulator. It will be appreciated that the 0 state which requires the least amount of transmission power is assigned to the most likely or occur of the four-bit output codes. In most video signals the most likely occurrence (from point to point) will be no change. Consequently, the 0 constellation state is ideal for the four-bit output code corresponding to no change. As mentioned, the likelihood of occurrence of the other four-bit output codes is determined empirically with the codes less likely to occur being transmitted by the constellation states requiring increased transimission power. The 15 four-bit output codes of FIG. 4 correspond to constellation states 0-14 with constellation state 15 being used for the linking code (the highest transmission power state). The eight-bit output codes are transmitted using this constellation state. In this way, the data in the vertical blanking interval is compressed and requires minimum transmission power. The reduced transmission power enables the data to be sent with low power television signals corresponding to Taboo co-channel and adjacent channels.

It is recognized that the number of packets selected is arbitrary. In the preferred embodiment, the 12-bit packets are believed to be satisfactory in view of the conjoint demands of resolution, transmission power and system cost. Variations in the preferred embodiment will occur to those skilled in the art without departing from the true spirit and scope of the invention which is to be limited only as defined in the claims.

What is claim is:

1. A method of operating a video signal transmitted system comprising the steps of:
    separating said video signal into first components having a relatively high transmission power requirement and second components having a relatively low transmission power requirement;
    encoding said first components into a plurality of data packets;
    compressing said data packets into a plurality of compressed codes based upon the likelihood of occurrence of said data packets in said video signal; and
    supplying said compressed codes to a modulator having a multi-state constellation with the most likely to occur of said compressed codes being modulated according to the state of said constellation requiring the least transmission power.

2. The method of claim 1 wherein said encoding step comprises sampling said first components and developing said data packets from contiguous groups of sampled first components.

3. The method of claim 2 wherein said modulator is a quadrature modulator and wherein said compressing step further comprises correlating said data packets and said compressed codes with a lockup table.

4. The method of claim 3 wherein said data packets are in the form of 12-bit words and wherein said 12-bit words are mapped by said lockup table to four-bit compressed codes.

5. The method of claim 4 wherein said lockup table maps the majority of said 12-bit words to a common four-bit linking code and a unique eight-bit output code in order of their decreasing likelihood of occurrence.

6. A method of operating a video signal transmission system comprising the steps of:
    separating said video signal into first components having a relatively high transmission power requirement and second components having a relatively low transmission power requirement;
    sampling said first components and developing 12-bit word data packets from contiguous groups of samples;
    compressing said data packets into a plurality of four-bit compressed codes based upon their likelihood of occurrence in said video signal by correlating said data packets and said compressed codes with a lockup table, said lockup table mapping the majority of said 12-bit words to a common four-bit linking code and a unique eight-bit output code in order of their decreasing likelihood of occurrence in said video signal; and
    supplying said compressed codes to a quadrature modulator having a multi-state constellation with the most likely to occur of said compressed codes being modulated according to the state of said constellation requiring the least transmission power.

7. A video signal transmission system comprising:
means for developing a first signal comprising substantially high frequency video information and a second signal comprising substantially low frequency video information;
means for developing samples of said low frequency video information;
means for grouping said samples into 12-bit data packets;
means for comprising said 12-bit data packets into four-bit compressed codes; and
means for applying said four-bit compressed codes to a quadrature modulator having a plurality of constellation states such that the constellation state requiring the lowest transmission power corresponds to the four-bit compressed code having the greatest statistical probability of occurrence.

8. The system of claim 7 wherein said 12-bit data packets comprise delta modulation components defining the direction and slope of said samples.

9. The system of claim 8 wherein said data packets comprise three successive samples of two-bit direction and two-bit slope modulation components.

10. The system of claim 9 wherein said compressing means include a lookup table for mapping said 12-bit data packets to said four-bit compressed codes.

11. The system of claim 10, further including:
multiplexer means having inputs coupled to said applying means and to said means for developing said first signal and an output coupled to said quadrature modulator.

12. A video signal transmission system comprising:
means for developing a first signal comprising substantially high frequency video information and a second signal comprising substantially low frequency video information;
means for developing samples of said low frequency video information;
means for delta modulating said samples into a two-bit direction component and a two-bit slope component;
means for grouping said delta modulation components of three successive samples into 12-bit data packets;
means for compressing said 12-bit data packets into four-bit compressed codes, said compressing means including a lookup table for mapping said 12-bit data packets to said four-bit compressed codes;
a quadrature modulator having a plurality of constellation states with the constellation state requiring the lowest transmission power corresponding to the four-bit compressed code having the greatest statistical probability of occurrence; and
multiplexer means having inputs of said four-bit compressed codes and said first signal and an output coupled to said quadrature modulator.

13. A video signal transmission system comprising:
at a transmitter;
means for developing a first signal comprising substantially high frequency video information and a second signal comprising substantially low frequency video information;
means for developing samples of said low frequency video information;
means for grouping said samples into 12-bit data packets;
means for compressing said 12-bit data packets into four-bit compressed codes;
means for applying said four-bit compressed codes to a quadrature modulator having a plurality of constellation states such that the constellation state requiring the lowest transmission power corresponds to the four-bit compressed code having the greatest statistical probability of occurrence;
at a receiver;
means for receiving and demodulating said four-bit compressed codes;
means for expanding said four-bit compressed codes to said 12-bit data packets;
means for recovering said samples from said 12-bit data packets; and
means for reconstructing said low frequency video information from said samples.

14. The system of claim 13 wherein said 12-bit data packets comprise three successive samples of two-bit direction and two-bit slope delta modulation components and wherein said compressing means and said expanding means include lookup tables for mapping said 12-bit data packets to said four-bit compressed codes and for mapping said four-bit compressed codes to said 12-bit data packets, respectively.

15. The system of claim 13, further including:
at the transmitter:
multiplexer means having inputs coupled to said applying means and to said means for developing said first signal and an output coupled to said quadrature modulator;
at the receiver:
means for demodulating said first signal; and
means for combining said first signal and said reconstructed low frequency signal.

16. A method of transmitting video components of a television signal, comprising:
entropy-encoding said video components; and
transmitting said entropy-encoded video components such that video information expected to occur more frequently in said television signal is transmitted with less power than video information expected to occur less frequently.

17. The method of claim 16 wherein said entropy-encoding of said video components comprises:
sampling and digitizing said video components and formatting the resulting signal into coded packets of video information; and
classifying the coded packets in accordance with their expected frequency of occurrence in said television signal.

18. The method of claim 17 wherein said coded packets comprise scene information related to a predetermined plurality of picture elements.

19. A method of transmitting video components of a television signal comprising:
separating out from said television signal video components having a relatively high power content;
entropy-encoding said separated out video components; and
transmitting said entropy-encoded components such that the video information expected to occur more frequently in said television signal is transmitted with less power than video information expected to occur less frequently.

20. A method of transmitting video components of a television signal comprising:

separating out from said television signal video components having a relatively high power content;
entropy-encoding said separated out video components; and
transmitting, during non video portions of the television signal, said entropy-encoded components such that video information expected to occur more frequently in said television signal is transmitted with less power than video information expected to occur less frequently.

21. A method of transmitting video components of a television signal, comprising:
sampling and digitizing said video components, and formatting the resulting signals into coded packets;
classifying said coded packets in accordance with their expected frequency of occurrence in said television signal; and
responsive to said classification, transmitting said coded packets such that video information expected to occur more frequently in said television signal is transmitted with less power than video information expected to occur less frequently.

22. The method of claim 21 wherein each of said coded packets comprises scene information related to a predetermined plurality of picture elements.

23. In the transmission of video components of a television signal, the method comprising:
sampling, digitizing and slope-and-direction encoding said video components; and
formatting the resulting signals into coded packets such that each of said coded packets comprises scene information related to a predetermined plural number of picture elements.

24. A method of transmitting video components of a television signal comprising:
separating components having a relatively high power content from said video signal;
entropy-encoding said separated components; and
transmitting said entropy-encoded components.

25. The method of claim 24 wherein said entropy-encoding comprises:
sampling and digitizing said separated components and formatting the resulting signals into coded packets; and
classifying said coded packets in accordance with their expected frequency of occurrence in said television signal.

26. The method of claim 25 wherein each of said coded packets comprises scene information related to a predetermined plurality of picture elements.

27. A method of transmitting video components of a television signal comprising:
separating video components having a relatively high power content from said television signal;
sampling and digitizing said video components and formatting the resulting signals into coded packets;
classifying said coded packets in accordance with their expected frequency of occurrence in said television signal; and
transmitting said entropy-encoded components such that the video information expected to occur more frequently in said television signal is transmitted with less power than the video information expected to occur less frequently.

28. A method of transmitting video components of a television signal comprising:
separating video components having a relatively high power content from said television signal;
entropy-encoding said separated video components; and transmitting said entropy-encoded components during non-video portions of said television signal.

29. The method of claim 28 wherein said entropy-encoding of said components comprises:
sampling and digitizing said separated video components and formatting the resulting signal into coded packets; and
classifying said coded packets in accordance with their expected frequency of occurrence in said television signal.

30. The method of claim 29 wherein each of said coded packets comprises scene information related to a plurality of picture elements.

31. A method of transmitting video components of a television signal comprising: entropy-encoding said video components; and
Transmitting said entropy-encoded components during non video portions of said television signal.

32. The method of claim 31 wherein said entropy-encoding comprises:
sampling and digitizing said components and formatting the resulting signal into coded packets; and
classifying said coded packets in accordance with expected frequency of occurrence in said television signal.

33. The method defined by claim 32 wherein each of said coded packets comprises slope-and-direction scene information related to a predetermined plurality of picture elements.

34. The method for transmitting a television signal with normal geographical coverage, but at sufficiently low power to permit use of the FCC-restricted "taboo" television channels, comprising:
separating video components having a relatively high power content from said television signal;
digitally encoding said separated video components into packets in accordance with spatially related image information;
classifying said packets in accordance with expected frequency of occurrence in said television signal; and
responsive to said classification, transmitting said digitally encoded video components such that video information expected to occur less frequently in said television signal is transmitted with less power than video information expected to occur more frequently,
whereby, by the separation of said relatively high power video components of said television signal, and the transmission of said separated video components in digitally encoded, classified packet form at power levels inversely related to their likelihood of occurrence in said television signal, the transmission power required is sufficiently low as to permit use of said taboo channels.

35. A method for transmitting a television signal with normal geographical coverage, but at sufficiently low power to permit use of the FCC-restricted "taboo" television channels, comprising:
separating video components having a relatively high power content from said television signal;
entropy-encoding said separated video components;
transmitting said entropy-encoded video components such that video information expected to occur more frequently in said television signal is transmitted with less power than video information expected to occur less frequently; and causing said transmission of said entropy-encoded video components to occur during non video portions of said televison signal, whereby, by the separation of said higher power video components of said television signal, and their transmission in encoded form at power levels inversely related to their likelihood of occurrence in said television signal, the transmission power required is sufficiently low as to permit use of said taboo channels.

36. A method of operating a transmission system, including a video signal, comprising the steps of:

at a transmitter;

separating said video signal into first components having a relatively high transmission power requirement and second components having a relatively low transmission power requirement;

encoding said first components into a plurality of data packets;

compressing said data packets into a plurality of compressed codes based upon their likelihood of occurrence in said video; and supplying said compressed codes to a modulator having a multi-state constellation with the most likely to occur of said compressed codes being modulated according to the state of said constellation requiring the least transmission power;

at a receiver;

receiving said compressed codes;

expanding said compressed codes to recover said data packets;

decoding said data packets to receiver said first components; and combining said first components with said second components.

37. A method of transmitting and receiving video components of a television signal, comprising:

entropy-encoding said video components;

transmitting said entropy-encoded video components such that video information expected to occur more frequently in said television signal is transmitted with less power than video information expected to occur less frequently;

receiving said entropy-encoded video components; and decoding said entropy-encoded components.

38. A method of transmitting and receiving video components of a television signal, comprising:

sampling and digitizing said video components and formatting the resulting signals into coded packets;

classifying said coded packets in accordance with their expected frequency of occurrence in said television signal;

responsive to said classification, transmitting said coded packets such that video information expected to occur more frequently in said television signal is transmitted with less power than video information expected to occur less frequently;

receiving said coded packets;

deformatting said coded packets into said resulting signals; and recovering said video components from said resulting signals.

39. A method of transmitting and receiving a video signal with normal geographical coverage, but at sufficiently low power to permit use of the FCC-restricted "taboo" television channels, comprising:

separating components having a relatively high power content from said video signal;

digitally encoding said separated components into packets in accordance with spatially related image information;

classifying said packets in accordance with their expected frequency of occurrence in said video signal;

responsive to said classification, transmitting said packets such that video information expected to occur less frequently in said video signal is transmitted with less power than video information expected to occur more frequently, whereby the separation of said relatively high power content components of said video signal, and the transmission of said separated components in classified, digitally encoded packet form at power levels inversely related to their likelihood of occurrence in video signal, the transmission power required is sufficiently low as to permit use of said taboo channels;

receiving said packets;

recovering said separated components from said packets; and reconstituting said video signal using said separated components.

* * * * *